(12) United States Patent
Demick et al.

(10) Patent No.: US 8,790,209 B2
(45) Date of Patent: Jul. 29, 2014

(54) MOTOR ASSEMBLY FOR FINAL DRIVE

(71) Applicant: Caterpillar Inc., Peoria, IL (US)

(72) Inventors: Christopher J. Demick, Fuquay-Varina, NC (US); Nathan S. Enderle, East Peoria, IL (US); Paul A. Dvorak, Sanford, NC (US)

(73) Assignee: Caterpillar Inc., Peoria, IL (US)

( * ) Notice: Subject to any disclaimer, the term of this patent is extended or adjusted under 35 U.S.C. 154(b) by 65 days.

(21) Appl. No.: 13/682,521

(22) Filed: Nov. 20, 2012

(65) Prior Publication Data

US 2014/0141917 A1    May 22, 2014

(51) Int. Cl.
*F16H 57/04* (2010.01)

(52) U.S. Cl.
USPC .......................................................... 475/159

(58) Field of Classification Search
USPC .......................................................... 475/159
See application file for complete search history.

(56) References Cited

U.S. PATENT DOCUMENTS

| | | | |
|---|---|---|---|
| 3,754,625 A * | 8/1973 | Voth et al. ................... | 192/221.1 |
| 3,770,074 A * | 11/1973 | Sherman ....................... | 180/65.6 |
| 4,461,373 A | 7/1984 | Pratt et al. | |
| 5,163,528 A * | 11/1992 | Kawamoto et al. ........ | 180/65.51 |
| 5,735,364 A | 4/1998 | Kinoshita | |
| 7,819,214 B2 | 10/2010 | Mizutani et al. | |
| 8,096,910 B2 * | 1/2012 | Shibukawa et al. ........... | 475/159 |
| 8,122,987 B2 * | 2/2012 | Murata et al. .............. | 180/65.51 |
| 8,128,525 B2 * | 3/2012 | Dinter et al. .................. | 475/159 |
| 8,251,852 B2 * | 8/2012 | Bohnstedt ..................... | 475/159 |
| 8,529,391 B2 * | 9/2013 | Degeling et al. .............. | 475/159 |

* cited by examiner

*Primary Examiner* — Dirk Wright
(74) *Attorney, Agent, or Firm* — Baker Hostetler

(57) ABSTRACT

A final drive for a vehicle is disclosed. The final drive includes a motor assembly, a planetary gear train and a drive sprocket. The motor assembly includes a hydraulic motor, an output shaft, a housing, a thrust bearing, a brake and first, second and third chambers. The housing includes a supply port, a first passageway, a second passageway and a drain port.

20 Claims, 4 Drawing Sheets

MOTOR ASSEMBLY FOR FINAL DRIVE

TECHNICAL FIELD

The present disclosure relates generally to a final drive and more specifically to a motor assembly for a final drive.

BACKGROUND

Many final drives of vehicles used in earth-moving, industrial and agricultural applications utilize hydraulic motors, such as bent axis motors and the like, to drive track assemblies or wheels. Such vehicles include, but are not limited to, track-type tractors, wheel loaders, excavators, articulated trucks and the like. With such final drive assemblies, a variety of components require fluid for cooling, lubrication, activation, and the like.

For example, conventional drive assemblies include several hydraulic, lubrication, and cooling lines. These fluid passageways cross one another in and around the final drive and typically each requires an independent pump to generate a fluid flow.

A conventional arrangement of fluid flow is found in U.S. Pat. No. 7,819,214 in which several fluid passageways (150, 160, and 180) supply fluid in and around the in-wheel motor. While this conventional method of fluid delivery may simplify the task of providing acceptable fluid flow (pressure and/or volume) for each of the fluid dependent subsystems, it greatly complicates the issue of routing these fluid passageways within the confines of the in-wheel motor and it increases the probability that a fluid passageway will fail.

Thus, there exists a need for an improved, compact, and cost-effective final drive in such vehicles.

SUMMARY

One aspect of the present disclosure is directed to a final drive. The final drive includes a motor assembly, planetary gear train, and drive sprocket. The motor assembly includes a hydraulic motor, output shaft, housing, thrust bearing, brake, first chamber, second chamber, and third chamber. The output shaft is coupled to the motor. The housing includes a supply port, first passageway, second passageway, and drain port. The first passageway is fluidly coupled to the supply port. The second passageway is fluidly coupled to the first passageway. The thrust bearing is coupled to the output shaft and the housing. The brake is coupled to the output shaft and the housing. The first chamber is defined by output shaft, the housing and the bearing. The first chamber is fluidly coupled to the second passageway. The second chamber is defined by the output shaft, the bearing and the brake. The second chamber is fluidly coupled to the bearing and the brake. The third chamber is defined by the brake, the motor and the output shaft. The third chamber is fluidly coupled to the brake and the drain port. The planetary gear train includes an input shaft coupled to the motor output shaft and an output shaft. The drive sprocket is coupled to the planetary gear train output shaft.

Another aspect of the present disclosure relates to a motor assembly for a final drive. The motor assembly includes a hydraulic motor, output shaft, housing, thrust bearing, brake, first chamber, second chamber, and third chamber. The output shaft is coupled to the motor. The housing includes a supply port, first passageway, second passageway, and drain port. The first passageway is fluidly coupled to the supply port. The second passageway is fluidly coupled to the first passageway. The thrust bearing is coupled to the output shaft and the housing. The brake is coupled to the output shaft and the housing. The first chamber is defined by output shaft, the housing and the bearing. The first chamber is fluidly coupled to the second passageway. The second chamber is defined by the output shaft, the bearing and the brake. The second chamber is fluidly coupled to the bearing and the brake. The third chamber is defined by the brake, the motor and the output shaft. The third chamber is fluidly coupled to the brake and the drain port.

Yet another aspect of the present disclosure pertains to a housing for a motor assembly. The housing includes a supply port, first passageway, second passageway, and drain port. The first passageway is fluidly coupled to the supply port. The second passageway is fluidly coupled to the first passageway. The housing is configured to receive a thrust bearing and a brake. The thrust bearing is coupled to an output shaft and the housing. The brake is coupled to the output shaft and the housing. The housing is further configured to include a first chamber, a second chamber and a third chamber. The first chamber is defined by output shaft, the housing and the bearing. The first chamber is fluidly coupled to the second passageway. The second chamber is defined by the output shaft, the bearing and the brake. The second chamber is fluidly coupled to the bearing and the brake. The third chamber is defined by the brake, the motor and the output shaft. The third chamber is fluidly coupled to the brake and the drain port.

DETAILED DESCRIPTION

Figure 1:
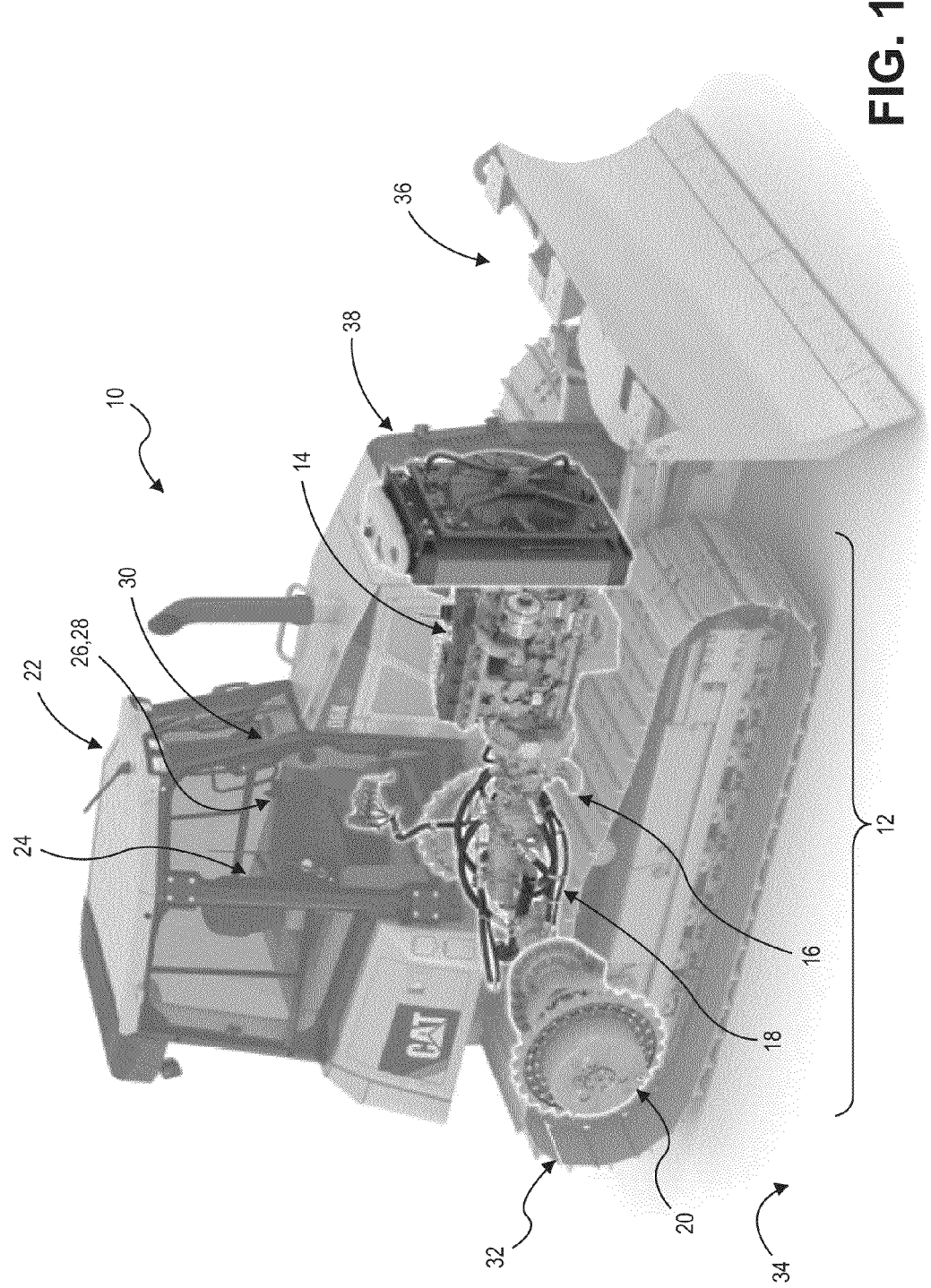
FIG. 1 is a perspective view of a vehicle according to an exemplary embodiment of the present disclosure.

Reference will now be made in detail to specific embodiments or features, examples of which are illustrated in the accompanying drawings. In general, a vehicle may include a variety of suitable drive components. Turning now to the particular example in FIG. 1, a vehicle 10 suitable for use with an embodiment of the present disclosure is shown. As shown in FIG. 1, the vehicle 10 includes a drive assembly 12 with a power plant 14, pump 16, hydrostatic transmission 18, and final drive 20. Although the vehicle 10 is shown to be a track-type tractor, it will be understood that in other embodiments, the vehicle may be any other type of vehicle or machine, used in earth-moving, industrial and agricultural applications, that utilizes a final drive. For example, the vehicle 10 may be, but not be limited to, compact and small wheel loaders, track type loaders and tractors, skid-steered loaders, asphalt compactors, tract-type tractor, motor grader, excavator, articulated truck, pipelayer, backhoe, or the like. It is also to be understood that the vehicle 10 and the final drive 20 is shown mainly for illustrative purposes to assist in disclosing features of various embodiments of the disclosure, and that FIG. 1 may not depict all of the components of an exemplary vehicle or of an exemplary final drive. For example, as used herein, the term, "final drive" is not limited to vehicles, but rather, includes any suitable gear train, planetary gear drive, transmission, output shaft, or the like.

The vehicle 10 may, optionally, include an operator cab 22 for use by an operator. If included, the cab 22 may include, for example, a seat 24, a steering mechanism 26, a speed-throttle or control lever 28, and a console 30. An operator occupying the cab 22 can control the various functions and motion of the vehicle 10, for example, by using the steering mechanism 26 to set a direction of travel for the vehicle 10 or by using the control lever 28 to set the travel speed of the vehicle 10. As can be appreciated, the representations of the various control mechanisms presented herein are generic and are meant to encompass all possible mechanisms or devices used to convey an operator's commands to a vehicle. While an operator cab 22 is shown in the illustrated embodiments, the inclusion of such a cab and associated seat, control mechanisms and console are optional in that the vehicle could alternately be autonomous, that is, the vehicle may be controlled by a control system that does not require operation by an on-board human operator.

In general, the drive assembly 12 is configured to respond to controls such as the steering mechanism 26 and speed-throttle or control lever 28 and, based on these controls, generate torque and transmit this torque, via a traction assembly 32, to a surface 34 such as, for example, the ground. In various particular examples, the torque is generated via the power plant 14. The power plant 14 may include any suitable power generating unit such as, for example, an internal combustion engine, including but not limited to a spark-ignition engine, a compression ignition engine, a rotary engine, a gas turbine engine, and/or an engine powered by gasoline, diesel fuel, bio-diesel, ethanol, methanol, and combinations thereof. The power plant 14 may also include a hydrogen-powered engine, a fuel cell, a solar cell, and/or any other power source known to persons skilled in the art.

The power plant 14 is configured to drive the pump 16 which, in turn, generates a flow of hydraulic fluid. In general, the pump 16 may include any suitable pumping device such as, for example, a hydraulic pump, a variable displacement hydraulic pump, or the like. The flow of hydraulic fluid from the pump 16 is controlled via the hydrostatic transmission 18 to hydraulically power components of the vehicle 10 such as the traction assembly 32 and/or a tool 36. In addition, the hydrostatic transmission 18 may include a plurality of hydrostatic transmissions. For example, a right-side hydrostatic transmission may be configured to power a right-side traction assembly 32 and a left-side hydrostatic transmission may be configured to power a left-side traction assembly 32. In this manner, the right and left-side traction assemblies 32 may be cooperatively modulated to move and steer the vehicle 10. The traction assembly 32 may include any suitable traction device to obtain purchase on the surface 34. Examples of suitable traction devices include tracks such as those shown in FIG. 1, tires, rollers, combinations of different traction devices, and the like. In general, the vehicle 10 may include any suitable tool 36 for such variety of tasks including, for example, loading, compacting, lifting, leveling or grading, brushing, digging, grappling, cutting, and the like.

To cool some or all of the fluids of the vehicle 10, the drive assembly 12 includes a cooling assembly 38. In general, the cooling assembly 38 is configured to remove heat from one or more fluids such as, for example, engine coolant, hydraulic fluid, transmission fluid, brake fluid, and the like, and transmit the heat to the air. More particularly, the cooling assembly 38 may include one or more fin-type radiators and one or more blowers to urge air to pass over the one or more radiators.

Figure 2:
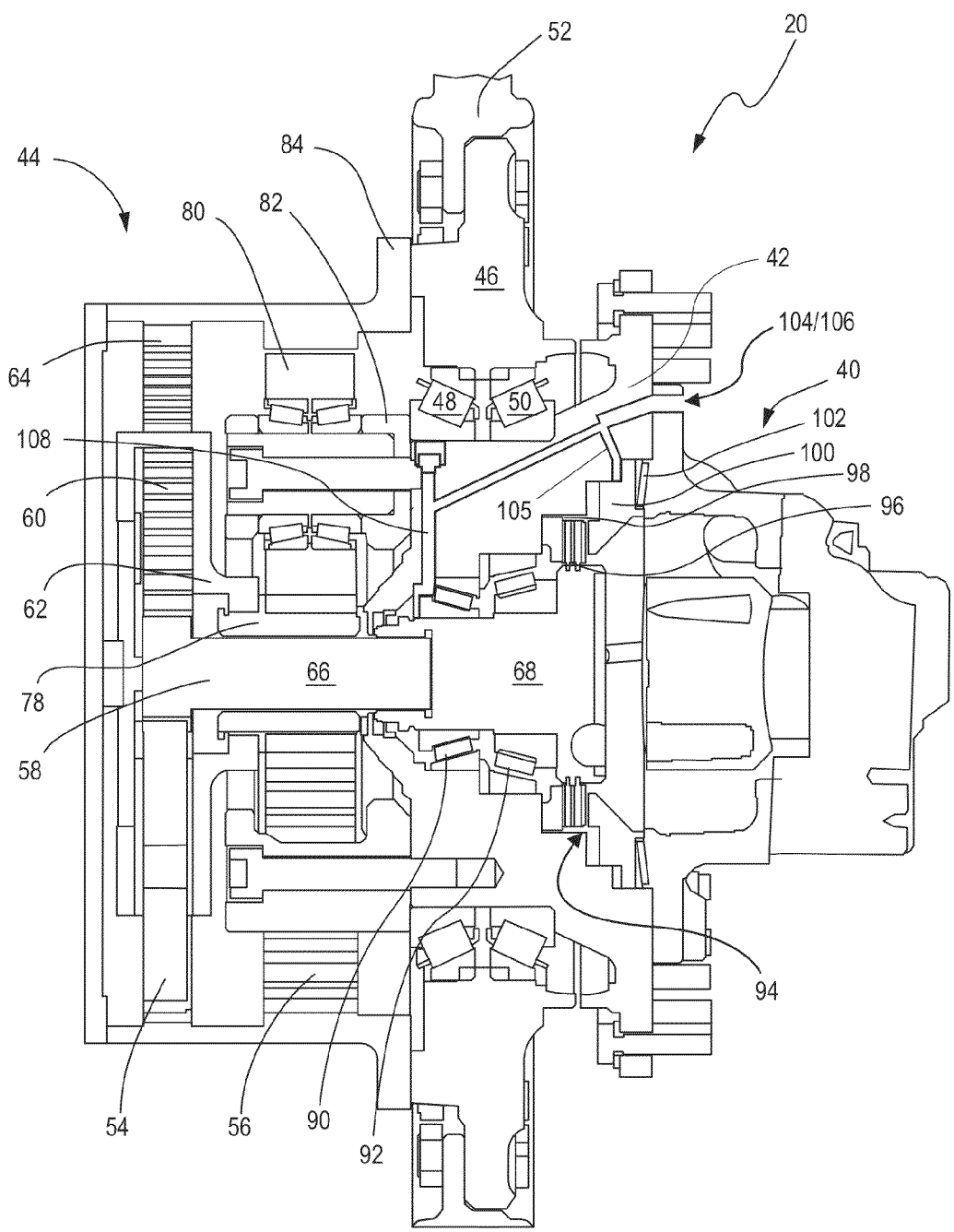
FIG. 2 is a cross-sectional view of a final drive according to an embodiment of the present disclosure.

As shown in FIG. 2, the final drive 20 may include an actuator or motor 40 coupled with a spindle or housing 42. For the purposes of this disclosure, the term, "final drive" may include, 'in-wheel motors' and other such drive units for vehicles. In general, the motor 40 includes any suitable actuator or device for generating torque to urge the various components of the final drive 20 to rotate. Examples of suitable actuators generally include hydraulically, electrically, pneumatically, and/or chemically (such as internal combustion) driven motors. In a particular example, the motor 40 may include a closed circuit hydrostatic motor such as a bent-axis hydraulic motor or the like. The final drive 20 may also comprise a planetary transmission 44 and a sprocket hub 46, with the motor 40 configured to drive the sprocket hub 46 and the planetary transmission 44 configured to transfer power from the motor 40 to the sprocket hub 46. The sprocket hub 46 may be coupled to a sprocket 52, which may support, including but not limited to, a wheel or track assembly such as the traction assembly 32 shown in FIG. 1. The sprocket hub 46 may be rotatably mounted on the housing 42 by a pair of sprocket bearings 48, 50.

The planetary transmission 44 may be comprised of, including but not limited to, a double reduction gear set, which may include a first reduction planetary gear set 54 and a second reduction planetary gear set 56. First planetary gear set 54 may comprise a first sun gear 58, a first plurality of planet gears 60, a first planet carrier 62, and a first ring gear 64. While rotatably mounted on first planet carrier 62, the first plurality of planet gears 60 may be in mesh with first sun gear 58 and first ring gear 64. The first sun gear 58 may be integrally formed with or coupled to a sun shaft 66, which is operatively connected to an output of motor 40. For example, the motor 40 may have an output shaft 68 splined to the sun shaft 66.

Second planetary gear set 56 may comprise a second sun gear 78, a second plurality of planet gears 80, a stationary second planet carrier 82, and a second ring gear 84 coupled to the sprocket hub 46, for example, by way of bolts. The second plurality of planet gears 80 may be rotatably mounted on the second planet carrier 82 and may be in mesh with second sun gear 78 and second ring gear 84. The second planet carrier 82 may be coupled to the housing 42, and the second ring gear 84 may be coupled to the sprocket hub 46. Furthermore, the first planet carrier 62 of first planetary gear set 54 may be splined to the second sun gear 78 of second planetary gear set 56.

During operation, the rotation of output shaft 68 via actuation of closed circuit hydrostatic motor 40 causes concurrent rotation of sun shaft 66 and first sun gear 58. As the first sun gear 58 rotates, so do first planet gears 60, which transfer the power to the first planet carrier 62 at a reduced speed. Rotation of the first planet carrier 62 causes rotation of the second sun gear 78, thereby transferring the power from the first planetary gear set 54 to the second planetary gear set 56, where the power is further reduced. As the second sun gear 78 rotates, the second planet gears 80 rotate. With the second planet carrier 82 fixed or stationary, the rotation of second planet gears 80 cause the second ring gear 84, and sprocket hub 46 coupled to the second ring gear 84, to rotate at a reduced speed. The reduced power from the sprocket hub 46 is translated to the sprocket 52, which then drives a wheel or track assembly, causing the vehicle 10 to move.

A set of output shaft bearing 90, 92 are disposed between the housing 42 and the output shaft 68. In addition, a parking brake 94 is disposed within the housing 42. In general, the parking brake 94 includes any suitable device for slowing or stopping rotation of the output shaft 68. In a particular example, the parking brake 94 includes one or more brake disks 96 in cooperative alignment and configured to intermesh with one or more separator plates 98. A brake piston 100 is urged against one of the separator plates 98 by a biasing member 102 such as a spring, Belleville washer or other such urging device. In use, the brake piston 100 is urged by the biasing member 102 to press upon the separator plate 98 and thereby compress the alternating stack of brake disks 96 and separator plates 98 together to generate sufficient friction to slow or prevent rotation. To disengage the parking brake 94, a brake release port 104 is disposed within the housing 42 to provide a conduit for the flow of a fluid 106. The brake release port 104 is fluidly coupled to the chamber of the brake piston 100 via one or more passageways, such as the brake conduit 105. The fluid 106 is provided to the chamber of the brake piston 100 at sufficient pressure to urge the brake piston 100 towards the biasing member and thereby disengage the brake piston 100 from the alternating stack of brake disks 96 and separator plates 98.

In an embodiment of the disclosure, a fluid passageway 108 is provided to channel the fluid from the brake release port 104 and past the brake piston 100 so that fluid may be delivered to a distal end of the output shaft bearing 90. As disclosed further herein, the fluid passageway 108 is configured to convey the fluid 106 through the output shaft bearings 90 and 92 and then through the parking brake 94. In this manner, a flow of the cooling and flushing fluid 106 may be provided to the output shaft bearings 90 and 92 and the parking brake 94 in an economical, cost effective, and greatly simplified manner as compared to conventional methods of providing flushing and cooling fluids.

In general, the fluid 106 includes any suitable combination of cooling, flushing, lubricating fluid, and/or the like. More particularly, suitable lubricants may include those having a viscosity of about Society of Automotive Engineers (SAE) 0W-20 to about SAE 15W-40 depending upon the ambient temperature.

Figure 3:
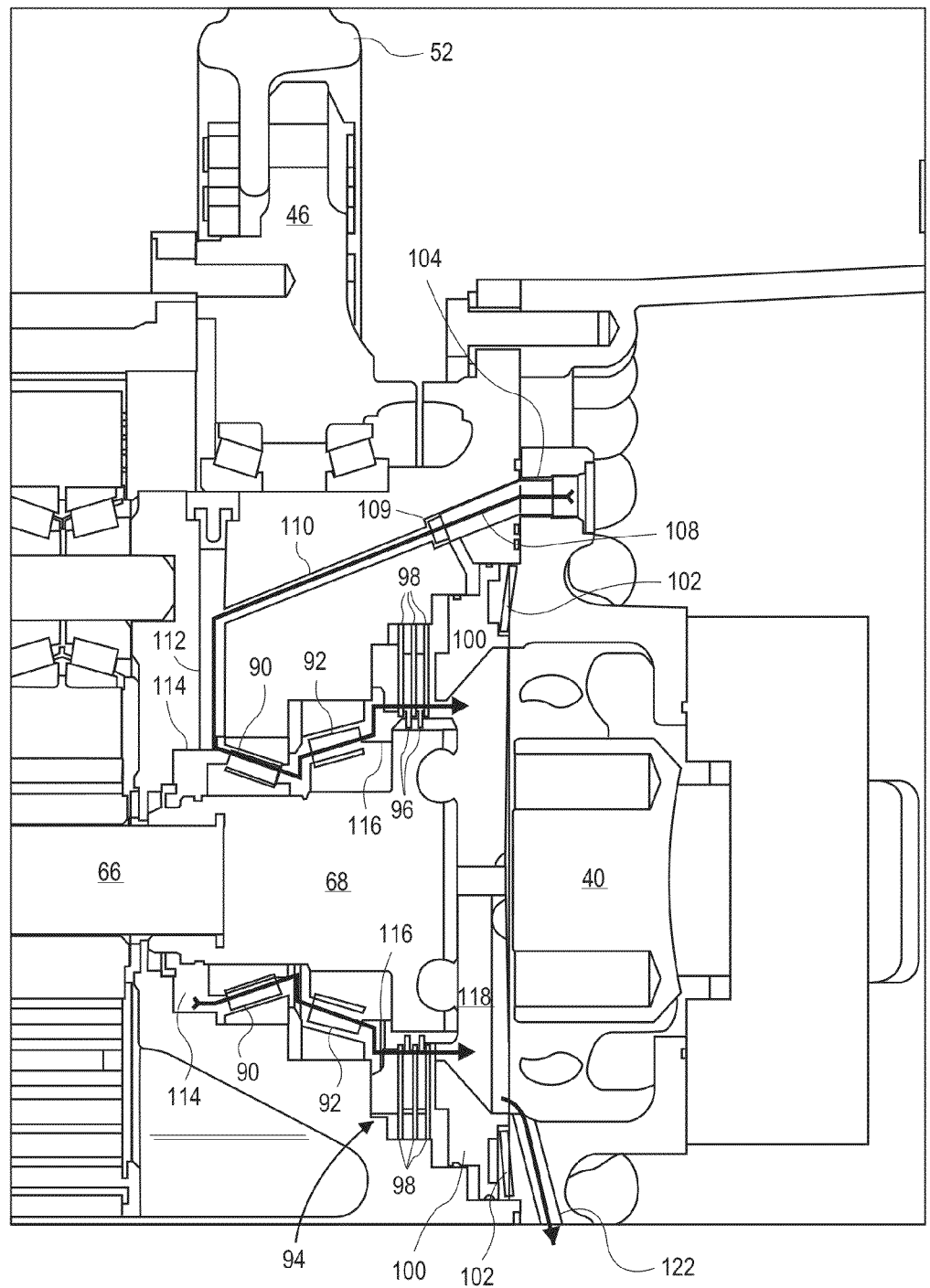
FIG. 3 is an enlarged cross-sectional view of a portion of the final drive of FIG. 2.

Referring now to FIG. 3, a more detailed view of the fluid passageway 108 is illustrated. In general, the fluid passageway 108 may include any suitable conduit, channel, bore, or the like to convey the fluid 106. As shown in FIG. 3, the fluid passageway 108 includes a passageway 110, passageway 112, annular chamber 114, annular chamber 116, and case chamber 118. In the particular example shown in FIG. 3, the passageways 110 and 112 may include bores milled into the housing 42. The passageway 110 extends downwardly at an angle through the housing 42 from a distal end of the brake release port 104 to a location more radially inward and relatively proximal to a distal portion of the output shaft bearing 90. In this manner, gravity may assist with the flow of the fluid 106. The distal end of the brake release port 104 can be in fluid communication with the brake conduit 105, and the brake release port 104 and the brake conduit 105 may form an L-shaped passageway. As shown, the fluid passageway 110 may have a cross-sectional area that is less than that of the brake release port 104, and an orifice 109 may couple the brake release port 104 to the fluid passageway 110 to reduce the pressure of fluid 106 for cooling, lubricating, and flushing purposes. Advantageously, orifice 109 allows the brake piston 100 to be actuated with high pressure fluid 106 from brake release port 104 while providing low pressure fluid 106 to fluid passageway 110 for cooling, lubricating, and flushing purposes. The passageway 112 intersects the fluid passageway 110 at a distal portion of the passageway 110 and extends downwardly through the housing 42 from the distal portion of the passageway 110 to the annular chamber 114. In this manner, gravity may assist with the flow of the fluid 106 through the passageway 112 and the passageways 110 and 112 are configured to fluidly connect the brake release port 104 to the annular chamber 114.

The annular chamber 114 is configured to provide a distal portion of the output shaft bearing 90 with a supply of the fluid 106. In response to the fluid 106 flowing through the annular chamber 114, the fluid 106 proceeds in an annular manner around the output shaft 68 and then flows in a proximal direction through the output shaft bearing 90 and then the output shaft bearing 92. In this manner, the annular output shaft bearings 90 and 92 may be provided a uniform flow of the fluid 106 that is initiated at a position distal to the motor 40 and then proceeds towards the motor 40. In so doing and as shown herein, the output shaft bearings 90 and 92 may be provided an essentially particulate-free flow of the fluid 106 to facilitate an increase in bearing life. Of note, while two output shaft bearings 90 and 92 are shown in FIG. 3, the various embodiments of the disclosure need not include two output shaft bearing, but rather, may include just one bearing, three bearing, or more.

From the output shaft bearings 90, 92, the fluid 106 proceeds along the fluid passageway 108 to the parking brake 94. More specifically, flow of the fluid 106 proceeds from the output shaft bearing 92, radially outward to the annular chamber 116 which is configured to provide a supply of the fluid 106 to the brake disks 96 and separator plates 98. It is an advantage of this and other embodiments of the disclosure that the flow of the fluid 106 through the output shaft bearings 90, 92 prior to the fluid 106 flowing through the brake 94 greatly extends the life of these bearings. It is another advantage of this and other embodiments that the radial, outward flow of the fluid 106 facilitates the flow of the fluid 106 and also facilitates the distribution of the fluid 106 though the various components. In various embodiments of the disclosure, the fluid passageway 108 conveys the fluid through holes or gaps in the brake disks 96 and/or separator plates 98. In this manner, the parking brake 94 is cooled. It is a particular advantage of this and other embodiments of the disclosure, that particulate matter generated via the action of the parking brake 94 is conveyed away from the output shaft bearings 90, 92.

After passing through the brake disks 96 and/or separator plates 98, the fluid 106 may pool in the case chamber 118 of the housing 42 between the parking brake 94 and the motor 40. As shown herein, the fluid 106 may then be collected and stored, in a storage tank for example, prior to being processed by filtration and/or cooling and then recirculated by a pump for example.

Of note, although a first passageway 110 and a second passageway 112 are shown, the various embodiments of the disclosure need not be limited to two passageways to fluidly connect the brake release port 104 with the annular chamber 116, but rather, a single passageway, a cast conduit, multiple passageways, or the like may be utilized. In a particular example, a cast conduit may be formed in the housing 42.

Figure 4:
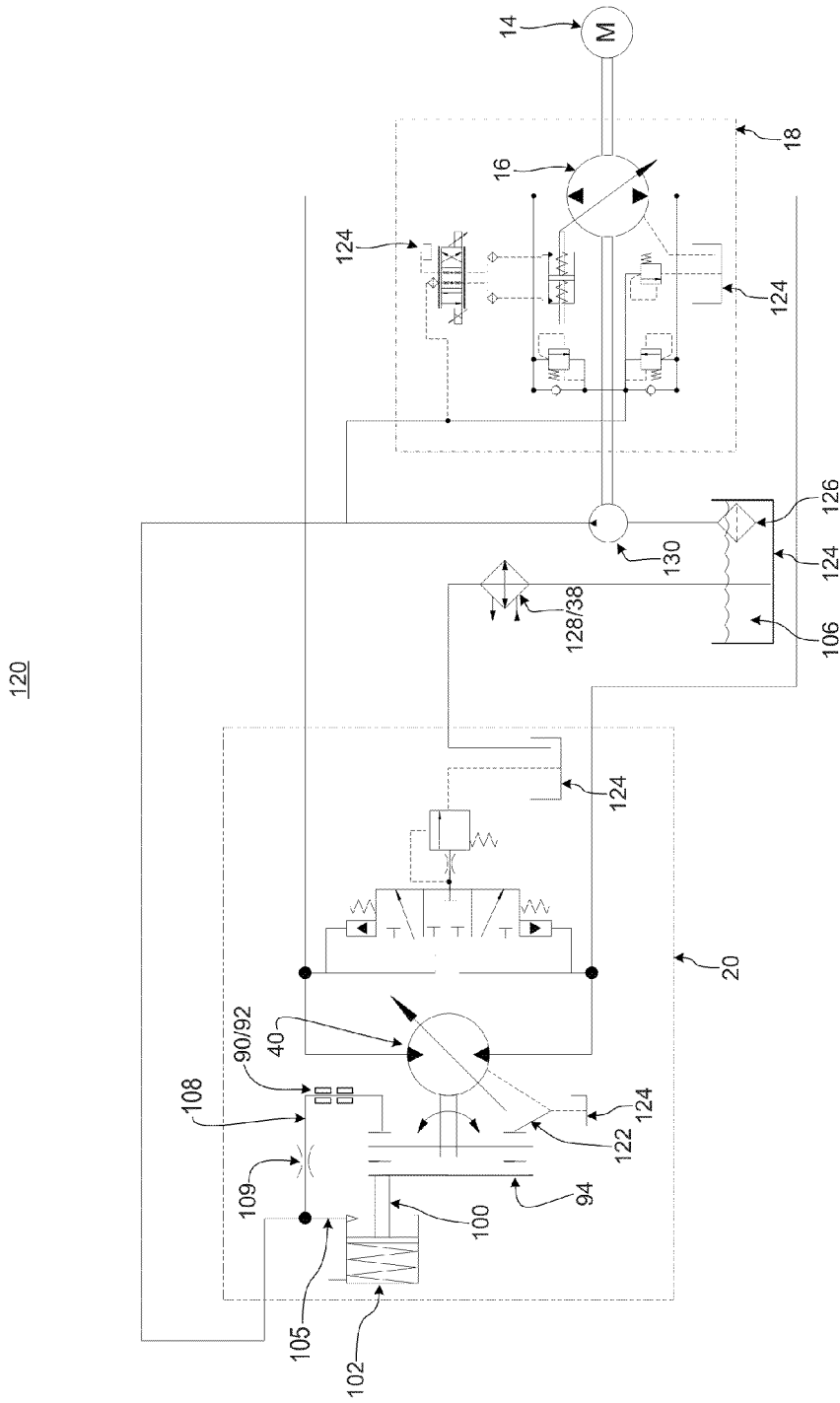
FIG. 4 is a system diagram of a fluid system in accordance with the embodiment of FIG. 3.

FIG. 4 is a simplified diagram of a fluid system 120 suitable for use with an embodiment of the disclosure. As shown in FIG. 4, the fluid system 120 provides a fluid conduit for the fluid 106 to be conveyed to the brake piston 100, output shaft bearings 90, 92, and bake disks 96 and separator plates 98. In addition, the fluid system 120 provides for the collection of the fluid 106 that passes through the motor 40 so that the fluid 106 may be collected, processed accordingly, and recirculated through the fluid system 120.

Following cooling, lubricating, and flushing of output shaft bearings 90,92 and/or the parking break 94, the fluid 106 is conveyed from the housing 42. For example, the housing 42 may be configured to combine the fluid 106 with the fluid 106 that has passed though the motor 40. In a particular example, a port, such as a case drain line 122, disposed at or near a low point of the housing 42 (shown in FIG. 3) may be configured to convey the fluid 106 from the housing 42 to a common oil storage tank 124. The fluid 106 may be held in the common oil storage tank 124 until drawn out to power/cool/lubricate the various components of the vehicle 10.

Optionally, the fluid system 120 includes a filter 126 to filter particulate matter from the fluid system 120. If included, the filter 126 may be configured to filter brake dust and/or other particulate matter that may be anticipated to be present and/or potentially harmful to the proper function of the vehicle 10. Also optionally, the fluid system 120 may include a heat exchange 128 and/or the fluid 106 may be conveyed to the cooling assembly 38 to remove waste heat from the fluid 106. To generate fluid pressure and urge the fluid 106 to flow through the fluid system 120, a pump 130. In addition, although not shown, the fluid system 120 may include a water removing device, various valves, and the like.

Although not shown in FIG. 4, the fluid system 120 may further be fluidly connected to various other components of the vehicle 10 such as, for example, the tool 36, actuators for moving the tool 36, and the like.

INDUSTRIAL APPLICABILITY

In general, the foregoing disclosure finds utility in various industrial applications, such as in earth-moving, industrial, construction and agricultural off-road vehicles and the like. In particular, the disclosed motor and final drive and method may be applied to a wheel loader, a track-type tractor, a motor grader, an excavator, an articulated truck, a pipelayer, a backhoe, and the like. As shown herein, embodiments of the disclosure greatly simplify the process and implementation of providing lubricating and cooling fluid to the components within the output shaft housing connected to the final drive unit. This overall reduction in fluid passageways facilitates placement of the output shaft housing within a vehicle. That is, by reducing the number of fluid hose connections to the output shaft housing, the placement of other components of the vehicle and the placement of the output shaft housing in proximity to these other components is made easier due to the reduction of hose connections. By applying this and other embodiments of the disclosure to a vehicle, a robust and simplified cooling and lubricating fluid system for a final drive can be achieved. Due to the disclosed configuration of the fluid system for the final drive, the life of the output shaft bearings and/or brake can be achieved. The flow path of the cooling/lubricating fluid can be arranged to draw potentially contaminating particulate matter away from the bearings. More specifically, since the flow path directs fluid from the bearings and towards the brake, particulate matter generated by the brake can be carried away from the bearings. Therefore, the bearing life can be extended.

To accomplish this design simplification that can synergistically result in extended bearing life, as shown in FIG. 4, the fluid system 120 provides a fluid conduit for the fluid 106 to be conveyed to the brake piston 100 and through the output shaft bearings 90, 92, and bake disks 96 and separator plates 98. The pump 130 urges the fluid 106 from the common oil storage tank 124 and towards the brake release port 104 (shown in FIG. 3). The fluid 106 fills the brake cavity to urge the brake piston 100 towards the biasing member 102. In so doing, the parking brake 94 is released so that the machine 10 can move. The passageway 108 branches from the brake release port 104 to supply the fluid 106 first to flush, cool, and/or lubricate the bearings 90, 92 and then to flush, cool, and/or lubricate the brake disks 96 and separator plates 98 of the parking brake 94. Thereafter, the fluid 106 is collected in the case chamber 116 and conveyed back to the common oil storage tank 124 via the case drain line 122. Optionally, the fluid 106 is filtered by the filter 126 and/or cooled via the heat exchange 128/cooling assembly 38.

Furthermore, the assembly of the fluid systems reduces the number of hydraulic hoses and associated components and fluid passageways through the output shaft housing. By employing a single existing fluid passageway and extending that fluid passageway to perform the function of two additional fluid passageways, the complexity can be greatly reduced. In the particular example shown herein, the existing brake release path can be extended to convey fluid to the output shaft bearing and then through the brake. Due to the elimination of separate fluid passageways, less space and/or fluid line connections may be required for the drive assembly, leading to a more compact design. In addition, the part count and/or number of machining operations of the drive assembly can be reduced as compared to conventional drive assemblies, thereby lowering the costs associated with manufacture.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. While some features are described in conjunction with certain specific embodiments of the disclosure, these features are not limited to use with only the embodiment with which they are described, but instead may be used together with or separate from, other features disclosed in conjunction with alternate embodiments of the disclosure.

What is claimed is:

1. A final drive, comprising:
a motor assembly, including:
    a hydraulic motor,
    an output shaft coupled to the hydraulic motor,
    a housing, including:
        a supply port,
        a first passageway fluidly coupled to the supply port,
        a second passageway fluidly coupled to the first passageway, and
        a drain port,
    a thrust bearing coupled to the output shaft and the housing;
    a brake coupled to the output shaft and the housing,
    a first chamber, defined by the output shaft, the housing and the bearing, fluidly coupled to the second passageway,
    a second chamber, defined by the output shaft, the bearing and the brake, fluidly coupled to the bearing and the brake,
    a third chamber, defined by the brake, the motor and the output shaft, fluidly coupled to the brake and the drain port;
a planetary gear train, including:
    an input shaft coupled to the motor assembly output shaft, and
    an output shaft; and
a drive sprocket coupled to the planetary gear train output shaft.

2. The final drive of claim 1, wherein the thrust bearing further comprises a plurality of thrust bearings fluidly connected to one another.

3. The final drive of claim 1, further comprising a filter disposed between the drain port and the supply port.

4. The final drive of claim 1, further comprising a heat exchange disposed between the drain port and the supply port.

5. The final drive of claim 1, further comprising a pump disposed between the drain port and the supply port.

6. The final drive of claim 5, further comprising brake piston biased to activate the brake, the brake piston being fluidly connected to the pump and being disengaged via fluid pressure generated by the pump.

7. The final drive of claim 1, further comprising an oil storage tank disposed between the drain port and the supply port.

8. The final drive of claim 7, further comprising a case drain line fluidly connecting the drain port to the common oil storage tank.

9. The final drive of claim 1, wherein a traction assembly coupled to the drive sprocket.

10. A motor assembly for a final drive, comprising
   a hydraulic motor;
   an output shaft coupled to the motor;
   a housing, including:
      a supply port,
      a first passageway fluidly coupled to the supply port,
      a second passageway fluidly coupled to the first passageway, and
      a drain port;
   a thrust bearing coupled to the output shaft and the housing;
   a brake coupled to the output shaft and the housing;
   a first chamber, defined by output shaft, the housing and the bearing, fluidly coupled to the second passageway;
   a second chamber, defined by the output shaft, the bearing and the brake, fluidly coupled to the bearing and the brake; and
   a third chamber, defined by the brake, the motor and the output shaft, fluidly coupled to the brake and the drain port.

11. The motor assembly of claim 10, wherein the thrust bearing further comprises a plurality of thrust bearings fluidly connected to one another.

12. The motor assembly of claim 10, wherein the first passageway is disposed at an angle in the housing.

13. The motor assembly of claim 10, wherein the second passageway is vertically disposed in the housing and fluidly connects the first passageway to the first chamber.

14. The motor assembly of claim 10, further comprising a pump disposed between the drain port and the supply port.

15. The motor assembly of claim 14, further comprising brake piston biased to activate the brake, the brake piston being fluidly connected to the pump and being disengaged via fluid pressure generated by the pump.

16. The motor assembly of claim 10, further comprising:
   a filter disposed between the drain port and the supply port; and
   an oil storage tank fluidly disposed between the drain port and the supply port.

17. The motor assembly of claim 16, further comprising a case drain line fluidly connecting the drain port to the common oil storage tank.

18. A housing for a motor assembly, comprising
   a supply port;
   a first passageway fluidly coupled to the supply port;
   a second passageway fluidly coupled to the first passageway; and
   a drain port,
   wherein the housing is configured to receive a thrust bearing and a brake, the thrust bearing being coupled to a hydraulic motor output shaft and the housing, the brake being coupled to the hydraulic motor output shaft and the housing, the housing being further configured to include a first chamber, a second chamber and a third chamber, the first chamber being defined by hydraulic motor output shaft, the housing and the bearing and fluidly coupled to the second passageway, the second chamber being defined by the hydraulic motor output shaft, the bearing and the brake and fluidly coupled to the bearing and the brake, and the third chamber being defined by the brake, the hydraulic motor and the output shaft and fluidly coupled to the brake and the drain port.

19. The housing of claim 18, wherein the first passageway is disposed at an angle in the housing.

20. The housing of claim 18, wherein the second passageway is vertically disposed in the housing and fluidly connects the first passageway to the first chamber.

* * * * *